July 22, 1952  V. W. SALMON  2,604,066
EMERGENCY BRAKE REMINDER
Filed June 9, 1950  2 SHEETS—SHEET 1
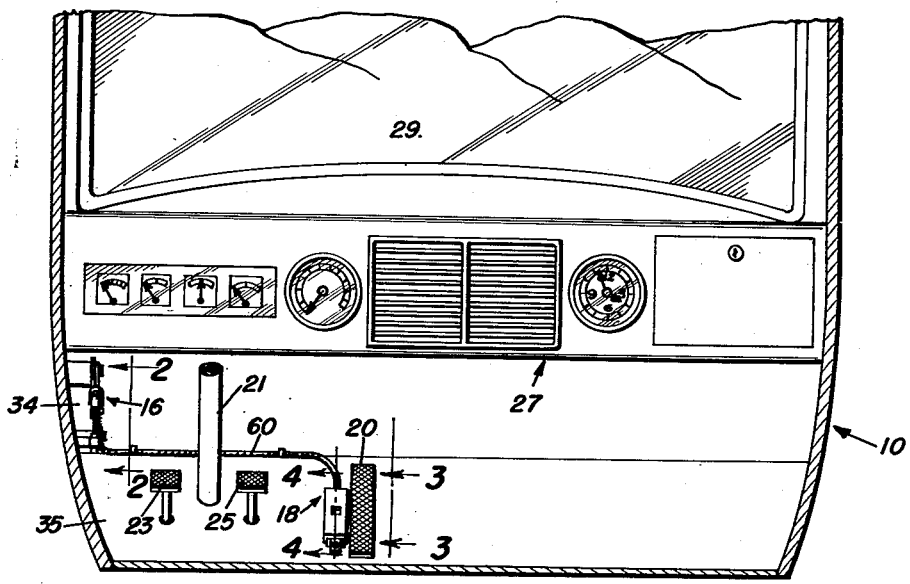
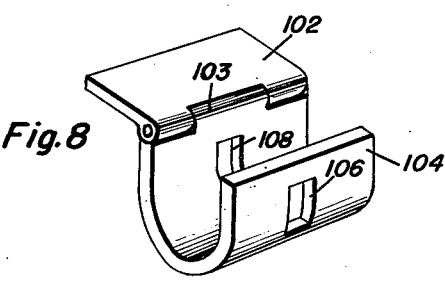
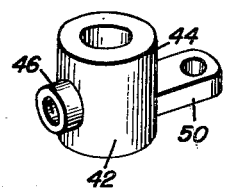
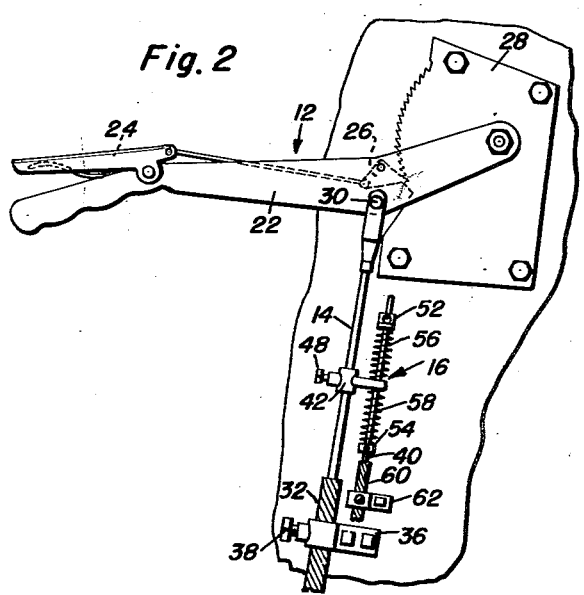
Vina W. Salmon
INVENTOR.

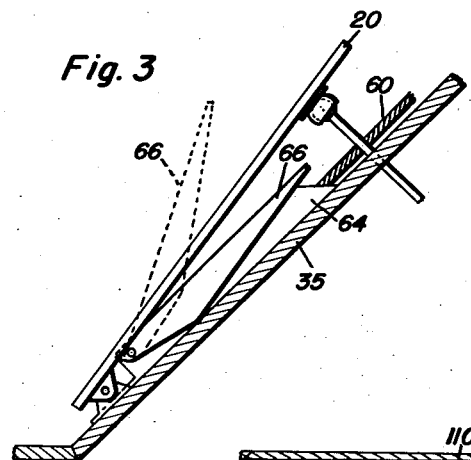
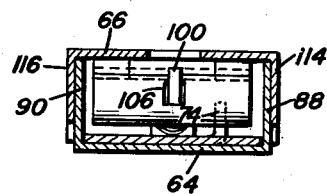
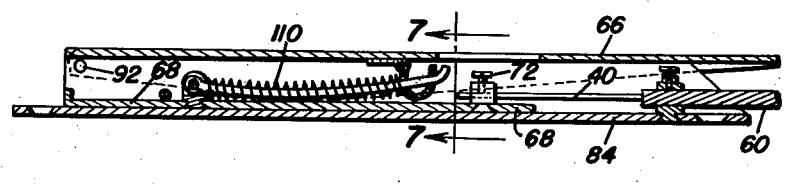
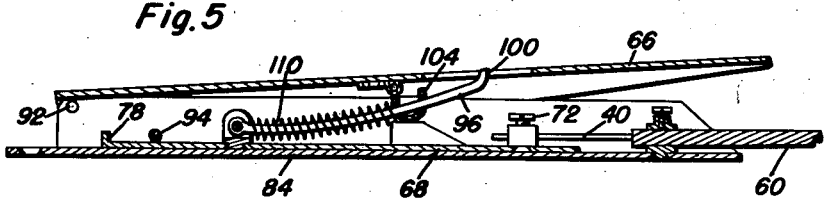
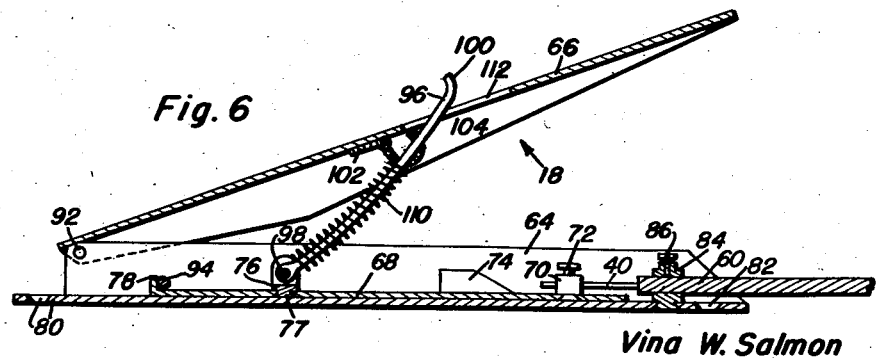

Patented July 22, 1952

2,604,066

UNITED STATES PATENT OFFICE 2,604,066

EMERGENCY BRAKE REMINDER

Vina W. Salmon, Deadwood, S. Dak.

Application June 9, 1950, Serial No. 167,025

2 Claims. (Cl. 116—28)

The present invention relates to improvements in emergency brake reminders and more particularly to the type wherein means is positioned adjacent the accelerator pedal for engagement by the foot of the person operating the vehicle whereby the person will become aware that the emergency brake is set.

An object of the present invention is to provide emergency brake reminder means which is actuatable by the emergency hand brake and becomes positioned for engagement with the right foot of the person operating the vehicle in order that he may be apprised of the fact that the brake is set.

A further object of the present invention is to provide such means that are easily connectible to the emergency hand brake and positioned on the floor board of a vehicle adjacent to the accelerator pedal, and wherein the means of the present invention offer no interference with the operation of the vehicle.

Other objects of the present invention are to provide such means that are economical of manufacture and of relative simplicity.

Various other objects and advantages will be apparent from the detailed description to follow. In the description as well as in the claims, parts are at times identified by specific names for convenience, but such nomenclature is intended to be as generic in its application to analogous art as the prior art will permit. My invention is clearly defined in the appended claims.

The best form in which I have contemplated applying my invention is illustrated in the accompanying drawings, wherein:

Figure 1 is a front elevational view of the present invention positioned on the floor board or wall of a vehicle;

Figure 2 is a side elevational view showing the connection between the flexible cable and a steel wire connected to the emergency hand brake;

Figure 3 is a side elevational view showing the emergency brake reminder positioned on the floor board in juxtaposition to the accelerator pedal;

Figure 4 is a side elevational view of the mechanism of the present invention in brake off position;

Figure 5 is a view similar to Figure 4 but wherein the emergency brake has been moved to partially set position;

Figure 6 is a view similar to Figures 4 and 5 but wherein the emergency brake is in full set position;

Figure 7 is a vertical transverse sectional view taken substantially along the line 7—7 of Figure 4; and, Figure 8 is a perspective view of slotted pivot member;

Figure 9 is a perspective view of the connector employed for connecting the flexible cable to the steel rod of the emergency brake mechanism.

Referring more particularly to the drawings, wherein like numerals designate like parts throughout, the numeral 10 designates generally the motor vehicle to which the structure of the present mechanism is attached. The numeral 12 designates generally the emergency hand brake mechanism having a flexible steel wire 14 for connection to the brake drums. The numeral 16 designates generally the connection between the emergency hand brake and the flexible cable of the present invention. The numeral 18 designates generaly the bracket and pivot elements which are operable by the flexible cable and which are positioned in juxtaposition to the accelerator pedal 20.

The emergency hand brake mechanism 12 includes the handle member 22 and ratchet release members 24 and 26, the ratchet plate 28, the flexible steel wire 14 pivotally connected to the handle member 22 by the pin 30 and having a cable covering 32 which is mounted on the tire wall 34 of the vehicle 10 by means of the bracket 36 and set screw 38.

A flexible cable 40 of the emergency brake reminder mechanism is connected to the steel wire 14 of the emergency brake mechanism by means of the connector 42. The connector 42 is provided with a tubular portion 44 receivable on the steel wire 14, and a tapped boss 46 for receiving a set screw 48 whereby the connector may be attached to the steel wire 14, and has an apertured ear 50 in which the flexible cable 40 is receivable. The flexible cable 40 is provided with a pair of spring retainers 52 and 54 and a pair of springs 56 and 58 are positioned on either side of the apertured ear 50 and have their outer ends abutting the spring retainers 52 and 54 whereby the flexible cable 40 is resiliently connected for reciprocation with the steel wire 14 of the hand brake mechanism.

The flexible cable 40 is provided with a cable covering 60 which is fixedly mounted on the fire wall 34 of the vehicle 10 by means of the bracket 62.

The foot engaging portion of the emergency brake reminder mechanism is formed from a bracket 64 which is fixedly secured to the floor board of the vehicle 10, a pivot pedal 66 which is adapted to engage the foot of the person operating the vehicle when the emergency brake is in set position, a slide element 68 which is reciprocably mounted on the bracket 64 and is connected to the flexible cable 40 by means of the element 70 and set screw 72. The slide element 68 is provided with an upwardly extending cam projection 74 and has a pivot mounting 76 secured thereto and in alignment with the cam projection 74. The end of the slide element 68 opposite to the connection to the wire cable 40 is provided with an upstanding flange 78.

The bracket 64 is provided with a pair of apertures 80 and 82 whereby the bracket may be secured to the floor board 35 of the vehicle 10 by conventional means. The bracket 64 also has securely mounted thereon a cable mounting 84 and set screw 86 for securing the end of the cable covering 60 in position.

The upstanding side portions 88 and 90 of the bracket 64 have a pin 92 extending therethrough upon which the pivot pedal 66 is pivotally mounted.

A stop pin 94 is mounted on the upstanding portions 88 and 90 and is positioned for engagement with the upstanding flange 78 and acts as a stop therefor.

A flexible rod 96 is pivotally mounted on the pivot mounting member 76 by means of the pin 98 and has an angulated end 100. A slotted bracket member has a flat portion 102 which is fixedly secured to the pivot pedal 66 and has an arcuately bent slotted hinge or guiding portion 104 pivotally mounted with respect to the flat portion 102. The flexible rod 96 is adapted to be positioned in the slots 106 and 108 of the arcuately bent portion 104 and has a spring 110 positioned for abutment against the mounting member 76 and the arcuately bent portion 104.

The pivot pedal 66 is provided with a longitudinal slot 112 which is adapted to receive the angulated end 100 of the flexible rod 96 when it is in its uppermost position.

From the foregoing description taken in conjunction with the drawings, it is believed that the operation of the present invention will be readily aparent to one skilled in the art. When the emergency brake 12 is in the off position shown in Figure 2, the brake reminder mechanism of the present invention will be in the position shown in Figure 4 and will not offer any interference with the foot of the person operating the accelerator 20. When the emergency brake handle 20 is moved upwardly, the steel wire 14 connected thereto will be simultaneously moved upwardly and the flexible cable 40 of the present invention will be resiliently moved upwardly through the spring connection at 16. The other end of the flexible cable 40 which is connected to the slide element 68 will longitudinally move the same causing the upstanding cam projection 74 to engage the arcuately bent slotted element 104 pivoting the pivot pedal 66 to the position shown in Figure 5. Continued upward movement of the emergency hand brake 22 will cause further sliding of the slide element 68 and will urge the flexible rod 96 through the slots 106 and 108 and in conjunction with the spring 110 the pivot pedal 66 will assume the position shown in Figure 6 of the drawings.

When the pivot pedal 66 of the present invention is in the position shown in Figure 6, the operator of the vehicle will, upon engaging his foot on the accelerator 20, also engage the pivot pedal 66 warning him that the emergency brake is set. It should be noted at this point that the pivot pedal 66 does not offer any material resistance to the foot of the operator and that the same may be depressed against the resilient urging of the springs whereby the accelerator pedal may be depressed during warming up of the engine.

It is believed that from the foregoing a device has been provided which will accomplish all of the objects hereinbefore set forth.

Having described the invention, what is claimed as new is:

1. An emergency brake indicating apparatus comprising: A flexible cable adapted to be connected at one end to the emergency brake handle for reciprocation therewith, a bracket mounted on the floor board of a vehicle adjacent the accelerator pedal, a pivot pedal mounted on said bracket, a slide element mounted on said bracket for movement relative thereto, a cam projection fixedly secured to said slide element, a guiding member having slots therein pivotally mounted on said pivot pedal for contact with the cam projection upon initial movement of said slide elements, a flexible rod pivotally mounted on said slide member and having its free end extending through the slots of said guiding member for elevating the pivot pedal upon movement of the slide element, resilient means positioned on said flexible rod and having one end abutting the pivot mounting of the rod and the other end abutting said guiding member to normally bias the pivot pedal against elevation thereof, said flexible cable having its other end secured to said slide element to effect sliding movement thereof upon reciprocation of the emergency brake handle.

2. An emergency brake indicating apparatus comprising: A flexible cable adapted to be connected to the emergency brake handle for reciprocation therewith, a bracket mounted on the floor board of a vehicle adjacent the accelerator pedal, a pivot pedal mounted on said bracket, a slide element mounted on said bracket for movement relative thereto, a cam projection fixedly secured to said slide element, a guiding member having slots therein pivotally mounted on said pivot pedal for contact with the cam projection upon initial movement of the slide element, a flexible rod pivotally mounted on said slide member and having its free end extending through the slots of said guiding member for elevating the pivot pedal upon movement of the slide element, resilient means positioned on said flexible rod and having one end abutting the pivot mounting of the rod and the other end abutting said guiding member to normally bias the pivot pedal against elevation, said slide element being connected to said flexible cable for sliding movement upon reciprocation of the emergency brake handle, wherein said flexible cable is provided with a pair of adjustably mounted spring retainers, a connector adapted to be adjustably mounted on the brake rod connected to the brake handle, and having an apertured ear receiving said flexible cable, a spring positioned on each side of said ear and having their outer ends abutting said spring retainers.

VINA W. SALMON.

REFERENCES CITED

The following references are of record in the file of this patent:

UNITED STATES PATENTS

| Number | Name | Date |
|---|---|---|
| 2,229,056 | Dick | Jan. 21, 1941 |
| 2,411,632 | Moran | Nov. 26, 1946 |